United States Patent
Ikegami et al.

(10) Patent No.: US 6,323,259 B1
(45) Date of Patent: *Nov. 27, 2001

(54) ACRYLIC RESIN COMPOSITION, ACRYLIC PREMIX, PROCESS FOR PRODUCING ACRYLIC ARTIFICIAL MARBLE AND THICKENING AGENT

(75) Inventors: Yukihiro Ikegami; Seiya Koyanagi; Yuichiro Kishimoto; Yoshihito Nakahara, all of Aichi (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/174,152

(22) Filed: Oct. 19, 1998

Related U.S. Application Data

(63) Continuation of application No. PCT/JP97/01208, filed on Apr. 9, 1997.

(30) Foreign Application Priority Data

Apr. 19, 1996 (JP) .................................................. 8-098186

(51) Int. Cl.⁷ ........................ C08F 220/20; C08F 120/18; C08L 31/02; C09D 5/29
(52) U.S. Cl. .......................... 523/171; 523/201; 523/340; 524/430; 525/228; 525/934; 526/323.1; 526/323.2; 526/329.7; 526/909; 526/932
(58) Field of Search .................................. 525/228, 934; 523/201, 340, 171; 526/932, 909, 323.2, 329.7, 323.1; 524/430

(56) References Cited

U.S. PATENT DOCUMENTS

| 3,050,785 | | 8/1962 | Cunningham . | |
|---|---|---|---|---|
| 3,846,368 | * | 11/1974 | Pettit, Jr. ........................... | 525/228 X |
| 3,970,725 | * | 7/1976 | Tugukuni et al. ................ | 525/228 X |
| 4,188,315 | * | 2/1980 | Dudinyak ......................... | 524/430 X |
| 4,342,858 | * | 8/1982 | Herman et al. .................. | 526/932 X |
| 4,469,825 | * | 9/1984 | Kowalski et al. ................ | 523/201 X |
| 4,542,171 | * | 9/1985 | Elser et al. ....................... | 523/201 |
| 4,678,819 | * | 7/1987 | Sasaki et al. .................... | 523/171 |
| 5,034,432 | * | 7/1991 | Ueno et al. ...................... | 525/934 X |
| 5,185,387 | * | 2/1993 | Klesse et al. .................... | 523/201 |
| 5,242,968 | * | 9/1993 | Minghetti et al. ................ | 524/430 |
| 5,625,021 | * | 4/1997 | Parusel et al. ................... | 526/329.7 |
| 5,856,378 | * | 1/1999 | Ring et al. ....................... | 523/340 X |
| 5,880,207 | * | 3/1999 | Delphin et al. .................. | 526/323.2 X |
| 6,028,127 | * | 2/2000 | Yanagase et al. ................ | 524/430 X |

FOREIGN PATENT DOCUMENTS

| 2 017 732 | | 10/1979 | (GB) . | |
| 2 165 252 | | 4/1986 | (GB) . | |
| 2-160648 | | 6/1990 | (JP) . | |
| 5-32720 | | 2/1993 | (JP) . | |
| 5-502269 | | 4/1993 | (JP) . | |
| 5-171022 | | 7/1993 | (JP) . | |
| 7-188505 | | 7/1995 | (JP) . | |
| 08225705 | | 9/1996 | (JP) . | |
| 2001705 | * | 1/1987 | (JP) ................................ | 526/323.2 |
| WO 92/03497 | | 3/1992 | (WO) . | |

OTHER PUBLICATIONS

D. H. Charlesworth, et al., A.I.Ch.E. Journal, vol. 6, No. 1, pp. 9–23, "Evaporation from Drops Containing Dissolved Solids", Mar., 1960.
Patent Abstracts of Japan, vol. 095, No. 001, Feb. 28, 1995, JP 06 298883, Oct. 25, 1994.

* cited by examiner

Primary Examiner—Richard D. Lovering
(74) Attorney, Agent, or Firm—Oblon, Spivak, McClelland, Maier & Neustadt, P.C.

(57) ABSTRACT

The present invention is directed to an acrylic resin composition obtained by adding a non-crosslinked polymer powder having a bulk density within the range from 0.1 to 0.7 g/ml, an oil absorption based on linseed oil within the range from 60 to 200 ml/100 g and a degree of swelling by methyl methacrylate of 16-fold or more as a thickening agent to acrylic syrup; and acrylic premix obtained by mixing an inorganic filler with this composition; and acrylic premix obtained by extruding constituent components by a kneading extruder to continuously form the mixture; and a method for producing an acrylic artificial marble in which these acrylic premixes are cured.

23 Claims, 1 Drawing Sheet

ACRYLIC RESIN COMPOSITION, ACRYLIC PREMIX, PROCESS FOR PRODUCING ACRYLIC ARTIFICIAL MARBLE AND THICKENING AGENT

This application is a Continuation of International Application No. PCT/JP97/01208, filed on Apr. 9, 1997.

TECHNICAL FIELD

The present invention relates to an acrylic resin composition useful as a raw material for an acrylic premix which has stable qualities, manifests high productivity and is excellent in handling property and molding-processability, a method for producing an acrylic artificial marble which manifests high productivity and is excellent in appearance, and a thickening agent.

BACKGROUND ART

Acrylic artificial marbles obtained by blending an acrylic resin with inorganic fillers such as aluminium hydroxide and the like have various prominent functions and characteristics such as an excellent appearance, soft feeling, weatherability and the like, and are widely used for counters such as a kitchen counter and the like, lavatory dressing tables, waterproof pans and other building uses. These artificial marbles are generally produced by filling a mold with what is called slurry obtained by dispersing inorganic fillers in acrylic syrup, and by curing and polymerizing the filled slurry at relatively low temperature. However, since this acrylic syrup has a low boiling temperature, there is no other selection than lowering the curing temperature, and consequently a long time is required for molding leading to low productivity. Further, since there is a problem regarding the filling ability of the slurry into a mold, the configuration of the resulting molded article is limited.

To improve these defects, there have been conventionally made investigations to produce an acrylic artificial marble by heat and pressure-molding of a premix obtained by thickening resin syrup with a thickening agent.

For example, Japanese Patent Application Laid-Open (JP-A) No. 5(1993)-32720 discloses an acrylic premix for an artificial marble, excellent in handling property and molding property, prepared by blending acrylic syrup with a crosslinked resin powder having a specific degree of swelling obtained by suspension polymerization. Further, Japanese Patent Application Laid-Open (JP-A) No. 6(1994)-298883 discloses an acrylic premix for an artificial marble, excellent in low shrinking property in heat-curing, prepared by blending acrylic syrup with a thermoplastic acrylic resin powder which is poor-soluble in the syrup. Further, Japanese Patent Application Laid-Open (JP-A) No. 6(1994)-313019 discloses an acrylic premix for an artificial marble which prevents cracking in molding and provides improved appearance and thickening stability of the resulting molded article by blending acrylic syrup with a resin powder prepared by the spray drying-treatment of a crosslinked polymer obtained by emulsion polymerization.

However, when the resin powders disclosed in Japanese Patent Application Laid-Open (JP-A) Nos. 5(1993)-32720 and 6(1994)-298883 are used, there are problems that production cost increases since a large amount of resin powder is required for thickening acrylic syrup and, further, productivity lowers since a long time is required for thickening.

Further, when the resin powder disclosed in Japanese Patent Application Laid-Open (JP-A) No. 6(1994)-313019 is used, there is a problem that aging of the premix for a long time (approximately 24 hours) is necessary for thickening up to such level that enables heat and pressure-molding.

DISCLOSURE OF INVENTION

The object of the present invention is to provide an acrylic resin composition which thickening in a short time, an acrylic premix which manifests high productivity, is suitable for molding at high temperature and is excellent in molding-processability, a method for producing an acrylic artificial marble which manifests high productivity and is excellent in appearance, and a thickening agent suitable for such uses.

The present inventors have intensively studied to accomplish the above-described object, and consequently have found that excellent effects can be obtained by blending acrylic syrup with a specific polymer powder as a thickening agent and have completed the present invention.

Namely, the present invention relates to an acrylic resin composition comprising a non-crosslinked polymer powder having a bulk density within the range from 0.1 to 0.7 g/ml, an oil absorption based on linseed oil within the range from 60 to 200 ml/100 g and a degree of swelling by methyl methacrylate of 16-fold or more, and acrylic syrup consisting essentially of methyl methacrylate or a (meth)acrylic monomer mixture (a) and polymethyl methacrylate or an acrylic copolymer (b); an acrylic premix comprising this acrylic resin composition and an inorganic filler; an acrylic premix obtained by kneading uniformly constituent components of this acrylic resin composition and an inorganic filler and simultaneously thickening and extruding the mixture to continuously form the mixture into a desired form; a method for producing an acrylic artificial marble in which these acrylic premixes are subjected to heat and pressure-curing; and a thickening agent consisting essentially of a non-crosslinked polymer powder having a bulk density within the range from 0.1 to 0.7 g/ml, an oil absorption based on linseed oil within the range from 60 to 200 ml/100 g and a degree of swelling by methyl methacrylate of 16-fold or more.

BEST MODE FOR CARRYING OUT THE INVENTION

Figure 1:
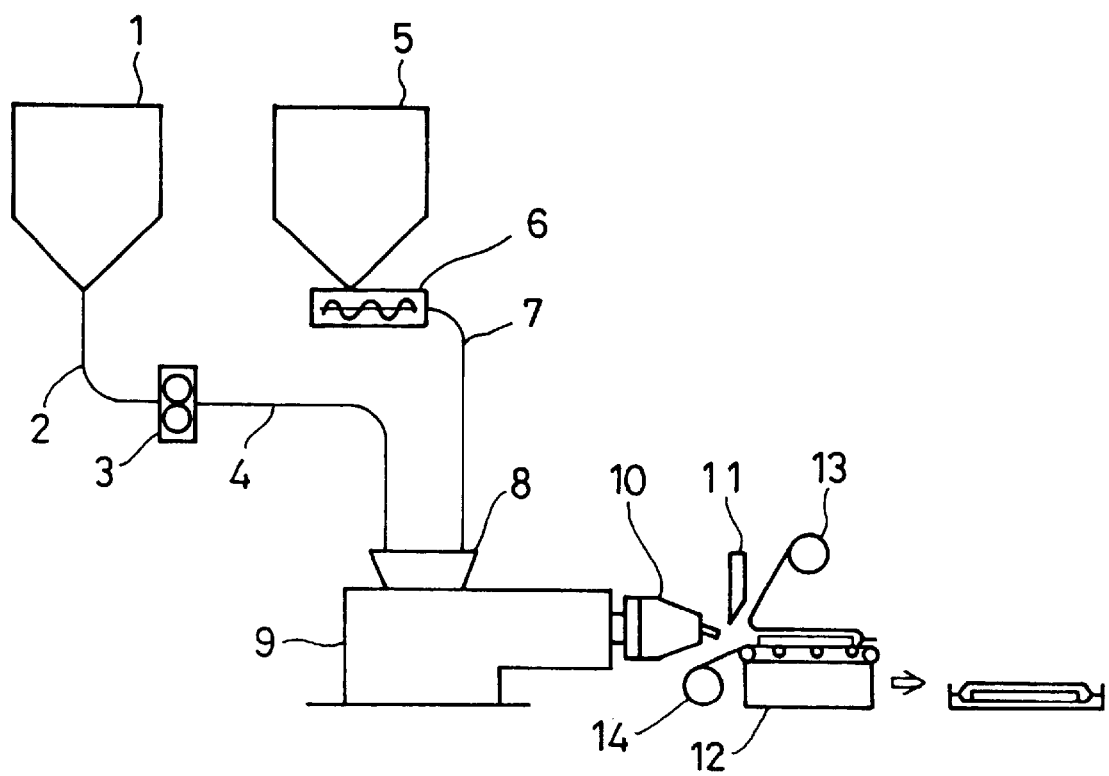
FIG. 1 is a schematic view showing one example of the continuous production method for the premix of the present invention.

The polymer powder used in the acrylic resin composition of the present invention is one which is used as a thickening agent, and should be a non-crosslinked polymer powder having a bulk density within the range from 0.1 to 0.7 g/ml, an oil absorption based on linseed oil within the range from 60 to 200 ml/100 g and a degree of swelling by methyl methacrylate of 16-fold or more.

The reason for this is that when the bulk density of the polymer powder is equal to or more than 0.1 g/ml, the polymer powder is not easily scattered, consequently, the yield in the production is excellent, and fuming caused in adding and mixing of the polymer powder into acrylic syrup decreases, consequently workability is excellent, and when the bulk density of the polymer powder is equal to or less than 0.7 g/ml, it is possible to obtain sufficient thickening effect with a small amount of the polymer powder and thickening is accomplished in a short time, therefore, there are obtained increased productivity and an advantage in cost. This bulk density is preferably within the range from 0.15 to 0.65 g/ml, more preferably within the range from 0.2 to 0.6 g/ml.

Further reason is that when the oil absorption based on linseed oil of the polymer powder is equal to or more than 60 ml/100 g, it is possible to obtain sufficient thickening effect with a small amount of the polymer powder and thickening is accomplished in a short time, therefore, there are obtained increased productivity and an advantage in cost, and when the oil absorption based on linseed oil of the polymer powder is equal to or less than 200 ml/100 g, the dispersibility of the polymer powder in acrylic syrup is excellent, and consequently, kneading property is excellent in producing an acrylic premix from an acrylic resin composition comprising the polymer powder and acrylic syrup. This oil absorption is preferably within the range from 70 to 180 ml/100 g, more preferably within the range from 80 to 140 ml/100 g.

Still further reason is that when the degree of swelling by methyl methacrylate of the polymer powder is equal to or more than 16-fold, effect for thickening acrylic syrup is sufficient. This degree of swelling is more preferably equal to or more than 20-fold.

Further, reason is that since the polymer powder is a non-crosslinked polymer, sufficient thickening effect is obtained in a short time, and when an acrylic resin composition comprising this polymer powder is used in the production of a granite-like artificial marble, clarity of grain pattern tends to be enhanced, and further, unevenness in grain pattern tends to disappear. It is hypothesized that such tendency occurs since a non-crosslinked polymer powder is swollen in acrylic syrup and then a part or all of the swollen product is immediately dissolved. In consideration of the balance between thickening effect and thickening time, it is preferable that the weight-average molecular weight of the polymer powder consisting of a non-crosslinked polymer is equal to or more than 100000. This weight-average molecular weight is more preferably within the range from 100000 to 3500000, further preferably within the range from 300000 to 3000000, and particularly preferably within the range from 500000 to 2000000. In the present invention, the term "non-crosslinked polymer powder" means a polymer powder at least the surface portion thereof is composed of a non-crosslinked polymer.

The specific surface area of the polymer powder used in the present invention is not particularly restricted, however, preferably within the range from 1 to 100 m$^2$/g. The reason for this is that if the specific surface area of the polymer powder is equal to or more than 1 m$^2$/g, sufficient thickening effect is obtained with a small amount of the polymer powder and thickening is possible in a short time to improve productivity, and further when an acrylic resin composition comprising this polymer powder is used for the production of a granite-like artificial marble, clarity of grain pattern tends to increase and unevenness of grain pattern tends to disappear, and if the specific surface area of the polymer powder is equal to or less than 100 m$^2$/g, handling property in thickening is excellent since dispersibility of the polymer powder in acrylic syrup is excellent, and when an acrylic premix is produced from an acrylic resin composition comprising the polymer powder and acrylic syrup, kneading property tends to be improved. This specific surface area is more preferably within the range from 3 to 100 m$^2$/g, and particularly preferably within the range from 5 to 100 m$^2$/g.

The average particle diameter of the polymer powder is not particularly restricted, however, preferably within the range from 1 to 250 µm. The reason for this is that when the average particle diameter is equal to or more than 1 µm, fuming of the powder tends to decrease and handling property of the polymer powder tends to be improved, and when the average particle size is equal to or less than 250 µm, the appearance of the resulting molding material, particularly gloss and surface smoothness tend to be improved. This average particle diameter is more preferably within the range from 5 to 150 µm, and particularly preferably within the range from 10 to 70 µm.

The polymer powder used in the present invention is preferably a secondary flocculate obtained by flocculation between primary particles. The reason for this is that when the polymer powder is the form of a secondary flocculate, the absorption speed of acrylic syrup components is fast and consequently thickening property tends to be extremely improved.

Further, in this case, the average particle diameter of the primary particle of the polymer powder is preferably within the range from 0.03 to 1 µm. The reason for this is that when the average particle diameter of the primary particle is equal to or more than 0.03 µm, the yield in producing the polymer powder as a secondary flocculate tend to be improved, and when the average particle diameter of the primary particle is equal to or less than 1 µm, sufficient thickening effect is obtained with a small amount of the polymer powder and thickening is possible in a short time, therefore, productivity increases, and further when an acrylic resin composition comprising this polymer powder is used in the production of a granite-like artificial marbles clarity of grain pattern tends to be enhanced and unevenness in grain pattern tends to disappear. The average particle diameter of this primary particle is more preferably within the range from 0.07 to 0.7 µm.

As polymers constituting the polymer powder, various compounds can be appropriately selected as the occasion demands, and they are not particularly restricted. If the appearance and the like of the resulting acrylic artificial marble are took into consideration, an acrylic polymer is preferred.

Examples of constituent components (monomers used for polymerization, and the like) of the polymer powder include alkyl (meth)acrylates carrying an alkyl group having 1 to 20 carbon atoms, cyclohexyl (meth)acrylate, glycidyl (meth)acrylate, hydroxyalkyl (meth)acrylates, (meth)acrylic acid, metal salts of (meth)acrylic acid, fumaric acid, fumarates, maleic acid, maleates, aromatic vinyls, vinyl acetate, (meth)acrylic amide, (meth)acrylonitrile, vinyl chloride, maleic anhydride and the like. These may be optionally polymerized alone or copolymerized in combination of two or more. In consideration of affinity with monomer components constituting acrylic syrup, (meth)acrylic monomers are preferable. In the present specification, the term "(meth)acrylic" means "acrylic and/or methacrylic".

Further, the polymer powder used in the present invention can be a polymer powder having what is called core/shell structure constituted of a core phase and a shell phase respectively composed of a polymer having different chemical composition, structure, molecular weight and the like each other. In this case, the core phase may be either a non-crosslinked polymer or a crosslinked polymer, however, the shell phase is required to be a non-crosslinked polymer.

As constituent components of the core phase and shell phase of the polymer powder, there are listed, for example, various components listed as examples of the constituent components of the polymer powder, and the like. These may be also optionally polymerized alone or copolymerized in combination of two or more. It is preferable to use methyl methacrylate as a main component of the shell phase since affinity with monomer components constituting acrylic syrup is enhanced.

For crosslinking the core phase, there may be used as the constituent components polyfunctional monomers such as ethylene glycol di(meth)acrylate, propylene glycol di(meth) acrylate, 1,3-butylene glycol di(meth)acrylate, 1,4-butylene glycol di(meth)acrylate, 1,6-hexanediol di(meth)acrylate, dimethylolethane di(meth)acrylate, 1,1-dimethylolpropane di(meth)acrylate, 2,2-dimethylolpropane di(meth)acrylate, trimethylolethane tri(meth)acrylate, trimethylolpropane tri(meth)acrylate, tetramethylolmethane tri(meth)acrylate, tetramethylolmethane di(meth)acrylate, neopentyl glycol di(meth)acrylate, polyhydric esters of (meth)acrylic acid and polyhydric alcohols [polyethylene glycol, polypropylene glycol, pentaerythritol, dipentaerythritol and the like], divinyl benzene, triallyl isocyanurate, allyl methacrylate and the like. These can be used alone or in combination of two or more.

Further, the polymer powder may contain an inorganic filler, however, for further increase of the thickening effect, it is preferable for the polymer powder to contain no inorganic filler.

The production method for the polymer powder is not particularly restricted, and, for example, public-known methods such as bulk polymerization, solution polymerization, suspension polymerization, emulsion polymerization, dispersion polymerization and the like are listed. Among other, a method in which an emulsion obtained by emulsion polymerization is subjected to treatments such as spray drying, freeze drying, salt/acid coagulation and the like to give a polymer powder hag excellent production efficiency and is preferred.

The acrylic syrup used in the acrylic resin composition of the present invention consists essentially of methyl methacrylate or a (meth)acrylic monomer mixture (a) and polymethyl methacrylate or an acrylic copolymer (b).

Methyl methacrylate or a (meth)acrylic monomer mixture (a) is preferably a unsaturated monomer or unsaturated monomer mixture containing methyl methacrylate in an amount within the range from 50 to 100% by weight. The content of the component (a) in the acrylic syrup is not particularly restricted, however, in consideration of workability when the acrylic resin composition of the present invention is used as an acrylic premix and physical properties such as mechanical strength and the like when this acrylic premix is used as a raw material for an acrylic artificial marble, the content is preferably within the range from 30 to 90% by weight. The reason for this is that when the content of the component (a) is equal to or more than 30% by weight, the syrup has low viscosity and therefore handling property thereof is excellent, and when the content of the component (a) is equal to or less than 90% by weight, shrinking rate in curing tends to lower. This content is more preferably within the range from 40 to 85% by weight, particularly preferably within the range from 50 to 80% by weight.

Examples of the monomer used in the component (a) other than methyl methacrylate include monofunctional monomers such as alkyl (meth)acrylates carrying an alkyl group having 1 to 20 carbon atoms, cyclohexyl (meth) acrylate, glycidyl (meth)acrylate, hydroxyalkyl (meth) acrylates, (meth)acrylic acid, metal salts of (meth)acrylic acid, fumaric acid, fumarates, maleic acid, maleates, aromatic vinyls, vinyl acetate, (meth)acrylic amide, (meth) acrylonitrile, vinyl chloride, maleic anhydride and the like; and polyfunctional monomers such as ethylene glycol di(meth)acrylate, propylene glycol di(meth)acrylate, 1,3-butylene glycol di(meth)acrylate, 1,4-butylene glycol di(meth)acrylate, 1,6-hexanediol di(meth)acrylate, dimethylolethane di(meth)acrylate, 1,1-dimethylolpropane di(meth)acrylate, 2,2-dimethylolpropane di(meth)acrylate, trimethylolethane tri(meth)acrylate, trimethylolpropane tri(meth)acrylate, tetramethylolmethane tri(meth)acrylate, tetramethylolmethane di(meth)acrylate, neopentyl glycol di(meth)acrylate, polyhydric esters of (meth)acrylic acid and polyhydric alcohols [polyethylene glycol, polypropylene glycol, pentaerythritol, dipentaerythritol and the like], divinyl benzene, triallyl isocyanurate, allyl methacrylate and the like. These may be used alone or in combination of two or more as the occasion demands.

To impart strength, solvent resistance, dimension stability and the like to a molded article obtained by using the acrylic resin composition of the present invention, it is preferable that the component (a) comprises a polyfunctional monomer such as a polyfunctional (meth)acrylic monomer or the like. In this case, the amount used of the polyfunctional monomer is not particularly restricted, however, the polyfunctional monomer is preferably used in an amount within the range from 3 to 50% by weight in the component (a) to obtain the above-described effect more efficiently.

In particular, it is preferable to use neopentyl glycol dimethacrylate as a monomer other than methyl methacrylate to be used in the component (a), since a molded article having remarkably excellent surface gloss is obtained. In this case, neopentyl glycol dimethacrylate and other polyfunctional monomers may be used together. The amount to be blended of neopentyl glycol dimethacrylate is not particularly restricted, however, it is preferable that the amount is equal to or more than 50% by weight based on the total amount of monomers other than methyl methacrylate in the component (a).

Polymethyl methacrylate or an acrylic copolymer (b) constituting the acrylic syrup used in the acrylic resin composition of the present invention is preferably an acrylic polymer containing a repeating unit of a methyl methacrylate structure in an amount within the range from 50 to 100% by mol. The content of the component (b) in the acrylic syrup is not particularly restricted, however, in consideration of workability when the acrylic resin composition of the present invention is used as an acrylic premix and physical properties such as mechanical strength and the like when this acrylic premix is used as a raw material for an acrylic artificial marble, the content is preferably within the range from 10 to 70% by weight, more preferably from 15 to 60% by weight, particularly preferably from 20 to 50% by weight.

The component (b) may be either a crosslinked polymer or a non-crosslinked polymer, and can be appropriately selected as the occasion demands. When flowability of the resulting resin composition and mechanical strength of a molding material are taken into consideration, the weight-average molecular weight is preferably within the range from 15000 to 300000, more preferably within the range from 25000 to 250000.

As the constituent components other than methyl methacrylate used in the component (b), there are listed, for example, various components previously listed as examples of the constituent components of the component (a), and the like. These can be also used in combination of two or more, and can be optionally copolymerized with a polyfunctional monomer. The component (b) can be produced by public-known polymerization methods such as solution polymerization, bulk polymerization, emulsion polymerization, suspension polymerization and the like.

The acrylic syrup used in the acrylic resin composition of the present invention may be a syrup obtained by dissolving the component (b) in the component (a), a syrup obtained by partial polymerization of the component (a) to produce the component (b) which is the polymer thereof in the component (a), or a syrup obtained by further adding the component (a) to this partial polymerized mixture or by further adding the component (b) to this partial polymerized mixture.

The contents of the polymer powder and acrylic syrup in the acrylic resin composition of the present invention are not particularly restricted, however, it is desirable that the content of the polymer powder is within the range from 0.1 to 100 parts by weight based on 100 parts by weight of the acrylic syrup. The reason for this is that when the amount used of the polymer powder is equal to or more than 0.1 part by weight, high thickening effect tends to be manifested, and when the amount used is equal to or less than 100 parts by weight, there is an inclination that dispersibility of the polymer powder is excellent and advantage in cost is obtained. This content of the polymer powder is more preferably within the range from 1 to 80 parts by weight.

The acrylic resin composition of the present invention becomes an acrylic premix particularly useful as a raw material of an acrylic artificial marble by further blending an inorganic filler, and optionally other additives and the like. The acrylic premix of the present invention has features that it has no stickiness and has excellent handling property and measurement and the like are easy.

In the acrylic premix of the present invention, the content of the inorganic filler is preferably within the range from 50 to 400 parts by weight based on 100 parts by weight of the acrylic resin composition. The reason for this is that when the content of the inorganic filler is equal to or more than 50 parts by weight, feeling, heat resistance and the like of the resulting molded article tend to be improved, and when the content is equal to or less than 400 parts by weight, there is a tendency that a molded article having high strength can be obtained.

As this inorganic filler, there can be appropriately used inorganic fillers such as aluminium hydroxide, silica, amorphous silica, calcium carbonate, barium sulfate, titanium oxide, calcium phosphate, talc, clay, glass powder and the like as the occasion demands. Particularly when the acrylic premix of the present invention is used as a molding material for an artificial marble, aluminium hydroxide, silica, amorphous silica and glass powder are preferred as the inorganic filler.

To the acrylic premix of the present invention, can be optionally added various additives such as curing agents, for example, organic peroxides, azo compounds and the like such as benzoyl peroxide, lauroyl peroxide, t-butyl hydroperoxide, cyclohexanone peroxide, methylethyl peroxide, t-butyl peroxyoctoate, t-butyl peroxybenzoate, dicumyl peroxide, 1,1-bis(t-butyl peroxy)3,3,5-trimethylcyclohexane, azobisisobutyronitrile and the like; reinforcing materials such as a glass fiber, carbon fiber and the like; coloring agents; low profile agents, and the like. In particular, by the addition of zinc stearate, a molded article having further excellent gloss can be obtained. The amount blended of zinc stearate is not particularly restricted, however, it is preferable that the amount is within the range from 0.05 to 4.0 parts by weight base on 100 parts by weight the acrylic premix. This amount blended is more preferably within the range from 0.1 to 2.0 parts by weight.

Further, a granite-like artificial marble having clear grain pattern and excellent in design can be obtained by further blending an inorganic filler-containing resin particle to the acrylic premix of the present invention and by molding the resulting mixture. It is hypothesized that the reason for this is that the acrylic premix of the present invention needs no aging period and thickens in a short time after completion of kneading, therefore, indefiniteness in the interface between grains and matrix due to swelling of the inorganic filler-containing resin particle is inhibited.

The amount blended of the inorganic filler-containing resin particle is not particularly restricted, however, it is preferable that the amount blended is within the range from 1 to 200 parts by weight based on 100 parts by weight of the acrylic premix. The reason for this is that when the amount blended of the inorganic filler-containing resin particle is equal to or more than 1 part by weight, grain pattern having excellent design tends to be obtained, and when the amount blended is equal to or less than 200 parts by weight, kneading property in producing the acrylic premix tends to be improved. This amount blended is more preferably within the range from 10 to 100 parts by weight.

As the resin constituting the inorganic filler-containing resin particle, any resin is permissible provided it is not dissolved in methyl methacrylate, and, for example, crosslinked acrylic resins, crosslinked polyester resins, crosslinked styrene resins and the like may be listed. The crosslinked acrylic resin is preferable since it has high affinity with the acrylic resin composition of the present invention and can provide a molded article having beautiful appearance. This crosslinked acrylic resin may also be one comprising polymethyl methacrylate or an acrylic copolymer obtained from a monomer mixture containing as a main component methyl methacrylate.

The inorganic filler constituting the inorganic filler-containing resin particle is preferably used in an amount within the range from 50 to 400 parts by weight based on 100 parts by weight of the resin. The reason for this is that when the content of the inorganic filler is equal to or more than 50 parts by weight, feeling and heat resistance of the resulting molded article tend to be improved, and when the content is equal to or less than 400 parts by weight, there is a tendency that a molded article having high strength can be obtained.

As this inorganic filler, there can be appropriately used inorganic fillers such as aluminium hydroxide, silica, amorphous silica, calcium carbonate, barium sulfate, titanium oxide, calcium phosphate, talc, clay, glass powder and the like as the occasion demands. Particularly when a granite-like artificial marble is produced, aluminium hydroxide, silica, amorphous silica and glass powder are preferred as the inorganic filler.

The production method for the inorganic filler-containing resin particle is not particularly restricted, there is listed, for example, a method in which a resin molded article containing an inorganic filler obtained by polymerization and curing using a heat press method, casting method and the like is ground and classified through a sieve. For example, a method in which the acrylic artificial marble molded as described above is ground and classified is preferable.

As the inorganic filler-containing resin particle, a particle of which particle diameter is equal to or less than the thickness of the molded article can be used, and such particle can be used alone or in combination of two or more particles each having different color or particle diameter.

There is no specific restriction regarding the kneading method for the constituent components to obtain the acrylic resin composition of the present invention and the acrylic premix using the composition, if it is a method capable of kneading a material having high viscosity efficiently.

In particular, since the acrylic resin composition of the present invention thickens in a short time, an acrylic premix can be produced continuously by kneading uniformly the constituent components of the acrylic resin composition and an inorganic filler and simultaneously thickening, and extruding the resulting mixture to form the mixture into a desired form. For this extrusion, public-known various methods can be used, and among other, a kneading extruder is suitably used.

The kneading extruder may not be limited if it has kneading function and extruding function in the machine, and a machine equipped with a screw can be listed as a no-limiting example. This screw preferably has a shape which lowers heat generation in kneading as much as possible, and it is more preferable to enable cooling water to flow through the inside of the screw. Regarding cooling, it is preferable to cool not only the screw itself but also parts around the screw, and public-known methods can be adopted. The diameter, length, depth of groove, number of revolution, temperature and the like of the screw may be suitably selected depending on treating amount, physical properties and the like required for a mixed product. Further, the screw may be monoaxial, biaxial or triaxial, and there is no limitation.

Next, one example of the continuous production method of the acrylic premix of the present invention will be described below using figures.

A liquid component among the constituent components of the premix was introduced into a tank 1, using an apparatus shown in FIG. 1. Regarding the liquid component used here, various combinations of the above-described various constituent components are possible provided they can pass through a liquid transport conduit (a) 2, liquid transport pump 3 and liquid transport conduit (b) 4. For example, a combination of syrup and additives such as a curing agent, internal releasing agent and the like is listed. When a liquid component obtained by mixing the various components is used, it is preferable to previously measure the various components and mix them sufficiently before being introduced into the tank 1.

It is preferable to select materials which are not chemically corroded where they are in contact with the liquid component, to make the tank 1, liquid transport conduit (a) 2, liquid transport pump 3 and liquid transport conduit (b) 4. The liquid transport pump 3 is not restricted provided it has quantitative supplying function as represented by a gear pump and snake pump, and it is preferable to select it considering physical properties such as viscosity and the like of the liquid component.

On the other hand, the powdery component among the constituent components of the acrylic premix is introduced into a tank 5. Regarding the powdery component used here, various combinations of the above-described various constituent components are possible provided they can pass through a quantitative feeder 6 and conduit 7. A combination of other vessel 5, quantitative feeder 6 and conduit 7 may further be added according to the number of the kind of the constituent components. When a powdery component obtained by mixing the various components is used, it is preferable to previously measure the various components and mix them sufficiently before being introduced into the vessel 5.

When a powdery component obtained by mixing components each having different particle diameter and specific gravity is introduced into the vessel 5, since there is a possibility that it is classified in the vessel 5, it is preferable that the vessel 5 has a mechanism capable of blending such as a agitating blade and the like. Further, it is preferable to use a material on which no chemical and physical influence is exerted by powdery components, to make the vessel 5.

The quantitative feeder 6 is one such as, for example, a screw feeder, and is not restricted provided it has such powder transport ability. The ratio (ratio by weight) of the supply of the quantitative feeder 6 and the supply of the liquid transport pump 3 is preferably as constant as possible. Therefore, it is preferable that introducing amounts of the liquid components and powdery components into a hopper 8 are controlled with constantly being weighed. As the controlling method, for example, a method which weighs the tank 1 and vessel 5 and other public-known methods can be used.

A conduit 7 is used for introducing the powdery components into the hopper 8. The liquid components and powdery components supplied to the hopper 8 are supplied to a kneading extruder 9. The liquid components and powdery components supplied are kneaded by the kneading extruder 9 and at the same time, the mixed product thickens in the kneading extruder to become a premix.

An extruding die 10 is mounted at the leading end of the kneading extruder 9, and regulates the cross sectional shape of the continuously extruded premix. The thickened premix is formed into a premix having a desired form by being extruded from the die 10. This formed premix is cut into given length by a cutter 11. The cutter 11 is one such as, for example, a guillotine cutter, and is not limited to this provided it has the equivalent function.

Figure 2:
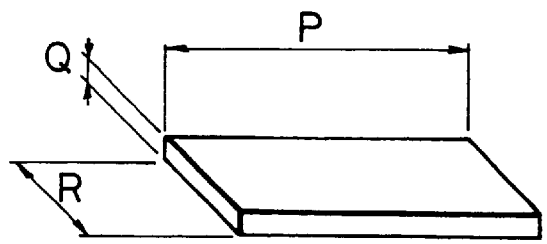
FIG. 2 is a schematic view showing one example of the premix formed into a sheet form.

FIG. 2 schematically shows one example of a premix formed into a sheet form. In FIG. 2, a mark P indicates length, a mark Q indicates thickness and a mark R indicates width, and dimensions of the marks P, Q and R may be suitably controlled to desired sizes respectively. This formed premix needs no aging, and can be transported to a mold directly after forming to be molded.

Further, since this formed premix has draping property, it is preferable to transport the premix by a conveyor 12 and the like after being discharged from the die 10 as shown in FIG. 1. When a long time is required for the transportation before molding, it is preferable to cover the formed premix from over and below the premix with covering films 13 and 14 to maintain natures and conditions of the premix. It is preferable that these covering films 13 and 14 have barrier ability against monomers and the like contained in the formed premix. Further, when the formed premix is transported, the premix is preferably stored in a vessel and the like to maintain the formed shape.

The acrylic artificial marble of the present invention can be obtained by filling the acrylic premix of the present invention into a mold and by subjecting the filled premix to heat and pressure-curing. Specific examples of this heat and pressure-curing method include, but not specifically limited to, a compression molding method, injection molding method, extrusion molding method and the like.

The following examples further specifically illustrate the present invention. In the following descriptions, all "parts" and "%" are by weight.

The measurements of physical properties were conducted as follows.

Physical properties of a polymer powder

Average particle diameter: It was measured using a laser scattering particle size distribution analyzer (LA-910, manufactured by HORIBA LTD.).

Bulk density: It was measured based on JIS R 6126-1970.

Oil absorption; It was measured based on JIS K 5101-1991, and the moment directly before a putty-like lump becomes soft suddenly with the addition of the last one drop of linseed oil was defined as completion point.

Weight-average molecular weight: It was measured by GPC method (expressed in terms of polystyrene).

Degree of swelling: A polymer powder was introduced into a 100 ml measuring cylinder, this cylinder was tapped lightly several times to press the content to be a volume of 5 ml, then to this was introduced methyl methacrylate cooled to a temperature equal to or less than 10° C. to make total amount to be 100 ml and the mixture was quickly stirred to obtain total uniformity, then, the measuring cylinder was maintained in a constant temperature bath for 1 hour at 25° C., the volume of the polymer powder layer after swelling was measured, and the degree of swelling was shown as the ratio of the volume after swelling (5 ml) to the volume before swelling.

Specific surface area: It was measured by the nitrogen adsorption method using a surface area analyzer SA-6201 (manufactured by HORIBA LTD.).

Physical property of acrylic syrup

Weight-average molecular weight: It is a measured value by GPC method.

(1) Production Example of polymer powder (P-1~P-3)

Into a reaction apparatus equipped with a condensation tube, thermometer, stirrer, dropping apparatus and nitrogen introducing tube were charged 925 parts of distilled water, 5 parts of sodium alkyldiphenyl ether disulfonate (trade name; Pellex 55-H, manufactured by Kao Corp.) and 1 part of potassium persulfate, and the resulted mixture was heated at 70° C. with stirring under nitrogen atmosphere. To this was added dropwise a mixture consisting of 500 parts of methyl methacrylate and 5 parts of sodium dialkylsulfosuccinate (trade name: Pelex OT-P, manufactured by Kao Corp.) over 3 hours before the resulting mixture was kept at that temperature for 1 hour, then the mixture was further heated up to 80° C. and kept at this temperature for 1 hour for completion of emulsion polymerization to obtain an emulsion in which the average particle diameter-of the primary particle of the polymer was 0.08 μm.

The resulted emulsion was subjected to spray drying treatment using a Pulvis GB-22 type spray drier manufactured by YAMATO SCIENTIFIC CO., LTD. at an inlet temperature/outlet temperature of 150° C./90° C. to obtain a non-crosslinked polymer powder (P-1) in which the average particle diameter of the secondary flocculate particle was 8 μm.

An emulsion obtained in the same manner as described above was subjected to spray drying treatment using a L-8 type spray drier manufactured by OHKAWARA KAKOHKI CO., LTD. at an inlet temperature/outlet temperature of 150° C./90° C. to obtain a non-crosslinked polymer powder (P-2) in which the average particle size of the secondary flocculate particle was 30 μm.

An emulsion obtained in the same manner as described above was subjected to spray drying treatment using a No. 62 type spray drier manufactured by ADV ANHYDRO CO., LTD. at an inlet temperature/outlet temperature of 150° C./90° C. to obtain a non-crosslinked polymer powder (P-3) in which the average particle diameter of the secondary flocculate particle was 100 μm.

Each non-crosslinked polymer powder obtained (P-1~P-3) could be dissolved in methyl methacrylate completely, and each degree of swelling was equal to or more than 20-fold. The other physical properties are shown in Table 1.

(2) Production Example of polymer powder (P-4)

An emulsion in which the average particle diameter of the primary particle of a polymer was 0.11 μm was obtained in the same manner as in the Production Examples of the polymer powders (P-1~P-3) except that the solution to be charged previously consisted of 625 parts of distilled water, 3 parts of sodium alkyldiphenyl ether disulfonate and 0.5 parts of potassium persulfate.

A non-crosslinked polymer powder (P-4) in which the average particle diameter of the secondary flocculate particle was 50 μm was obtained in the same manner as in the Production Example of the polymer powder (P-2) using the above-described emulsion obtained. The powder obtained (P-4) could be dissolved in methyl methacrylate completely, and the degree of swelling was equal to or more than 20-fold. The other physical properties are shown in Table 1.

(3) Production Example of polymer powder (P-5)

An emulsion in which the average particle diameter of the primary particle of a polymer was 0.20 μm was obtained in the same manner as in the Production Examples of the polymer powders (P-1~P-3) except that the solution to be charged previously consisted of 925 parts of distilled water, 5 parts of sodium alkyldiphenyl ether disulfonate and 0.5 parts of potassium persulfate and the monomer to be added dropwise was a mixture consisting of 480 parts of methyl methacrylate, 20 parts of ethyl acrylate and 5 parts of sodium dialkylsulfosuccinate.

A non-crosslinked polymer powder (P-5) in which the average particle diameter of the secondary flocculate particle was 20 μm was obtained in the same manner as in the Production Example of the polymer powder (P-2) (except that the inlet temperature/outlet temperature was 120° C./60° C.) using the above-described emulsion obtained. The powder obtained (P-5) could be dissolved in methyl methacrylate completely, and the degree of swelling was equal to or more than 20-fold. The other physical properties are shown in Table 1.

(4) Production Example of polymer powder (P-6)

An emulsion in which the average particle diameter of the primary particle of a polymer was 0.10 μm was obtained in the same manner as in the Production Examples of the polymer powders (P-1~P-3) except that the solution to be charged previously consisted of 925 parts of distilled water, 5 parts of sodium alkyldiphenyl ether disulfonate and 0.25 parts of potassium persulfate.

A non-crosslinked polymer powder (P-6) in which the average particle diameter of the secondary flocculate particle was 20 μm was obtained in the same manner as in the Production Example of the polymer powder (P-2) using the above-described emulsion obtained. The powder obtained (P-6) could be dissolved in methyl methacrylate completely, and the degree of swelling was equal to or more than 20-fold. The other physical properties are shown in Table 1.

(5) Production Example of polymer powder (P-7)

Into a reaction apparatus equipped with a condensation tube, thermometer, stirrer, dropping apparatus and nitrogen introducing tube were charged 925 parts of distilled water, 5 parts of sodium alkyldiphenyl ether disulfonate and 0.25 parts of potassium persulfate, and the resulted mixture was heated at 70° C. with stirring under nitrogen atmosphere. To this was added dropwise a mixture consisting of 149.85 parts of methyl methacrylate, 0.15 parts of 1,3-butylene glycol dimethacrylate and 5 parts of sodium dialkylsulfosuccinate over 1.5 hours before the resulting mixture was kept at that temperature for 1 hour, consequently 350 parts of methyl methacrylate was added dropwise over 3.5 hours before the resulting mixture was kept at that temperature for 1 hour, then the mixture was further heated up to 80° C. and kept at this temperature for 1 hour for completion of emulsion polymerization to obtain an emulsion in which the average particle diameter of the primary particle of the polymer was 0.10 μm.

The resulted emulsion was subjected to spray drying treatment using a L-8 type spray drier manufactured by OHKAWARA KAKOHKI CO., LTD. at an inlet temperature/outlet temperature of 150° C./90° C. to obtain a polymer powder (P-7) having a core/shell structure comprising a core phase composed of a crosslinked polymer and a shell phase composed of a non-crosslinked polymer, in which the average particle diameter of the secondary flocculate particle was 20 μm. The degree of swelling of the polymer powder having a core/shell structure obtained was equal to or more than 20-fold. The other physical properties are shown in Table 1.

(6) Production Example of polymer powder (P-8)

An emulsion in which the average particle diameter of the primary particle of a polymer was 0.6 μm was obtained in the same manner as in the Production Examples of the polymer powders (P-1~P-3) except that the solution to be charged previously consisted of 925 parts of distilled water, 5 parts of sodium polycarboxylate (trade name: Poise 530, manufactured by Kao Corp.) and 2 parts of potassium persulfate and the monomer to be added dropwise was a mixture consisting of 500 parts of methyl methacrylate and 3 parts of sodium dialkylsulfosuccinate.

A non-crosslinked polymer powder (P-8) in which the average particle diameter of the secondary flocculate particle was 25 μm was obtained in the same manner as in the Production Example of the polymer powder (P-2) using the above-described emulsion obtained. The powder obtained (P-8) could be dissolved in methyl methacrylate completely, and the degree of swelling was equal to or more than 20-fold. The other physical properties are shown in Table 1.

(7) Production Example of polymer powder (P-9)

An emulsion in which the average particle diameter of the primary particle of a polymer was 0.10 μm was obtained in the same manner as in the Production Examples of the polymer powders (P-1~P-3) except that the solution to be charged previously consisted of 925 parts of distilled water, 5 parts of polyoxyethylene nonyl phenyl ether (trade name: Emulgen 930, manufactured by Kao Corp.) and 1.5 parts of potassium persulfate and the monomer to be added dropwise was a mixture consisting of 500 parts of methyl methacrylate and 10 parts of sodium dialkylsulfosuccinate.

A non-crosslinked polymer powder (P-9) in which the average particle diameter of the secondary flocculate particle was 20 μm was obtained in the same manner as in the Production Example of the polymer powder (P-2) using the above-described emulsion obtained. The powder obtained (P-9) could be dissolved in methyl methacrylate completely, and the degree of swelling was equal to or more than 20-fold. The other physical properties are shown in Table 1.

(8) Production Example of polymer powder (P-10)

An emulsion in which the average particle diameter of the primary particle of a polymer was 0.15 μm was obtained in the same manner as in the Production Examples of the polymer powders (P-1~P-3) except that the solution to be charged previously consisted of 925 parts of distilled water, 5 parts of sodium alkyldiphenyl ether disulfonate and 0.15 parts of potassium persulfate.

A non-crosslinked polymer powder (P-10) in which the average particle diameter of the secondary flocculate particle was 20 μm was obtained in the same manner as in the Production Example of the polymer powder (P-2) using the above-described emulsion obtained. The powder obtained (P-10) could be dissolved in methyl methacrylate completely, and the degree of swelling was equal to or more than 20-fold. The other physical properties are shown in Table 1.

(9) Production Example of polymer powder (P-11)

An emulsion in which the average particle diameter of the primary particle of a polymer was 0.18 μm was obtained in the same manner as in the Production Examples of the polymer powders (P-1~P-3) except that the solution to be charged previously consisted of 925 parts of distilled water, 5 parts of sodium alkyldiphenyl ether disulfonate and 0.05 parts-of potassium persulfate.

A non-crosslinked polymer powder (P-11) in which the average particle diameter of the secondary flocculate particle was 20 μm was obtained in the same manner as in the Production Example of the polymer powder (P-2) using the above-described emulsion obtained. The powder obtained (P-11) could be dissolved in methyl methacrylate completely, and the degree of swelling was equal to or more than 20-fold. The other physical properties are shown in Table 1.

(10) Production Example of polymer powder (P-12)

Into a reaction apparatus equipped with a condensation tube, thermometer, stirrer, dropping apparatus and nitrogen introducing tube were charged 925 parts of distilled water, 5 parts of sodium alkyldiphenyl ether disulfonate and 2.5 parts of potassium persulfate, and the resulted mixture was heated at 80° C. with stirring under nitrogen atmosphere. To this was added dropwise a mixture consisting of 500 parts of methyl methacrylate, 3 parts of n-dodecyl mercaptan and 5 parts of sodium dialkylsulfosuccinate over 3 hours before the resulting mixture was kept at that temperature for 2 hour for completion of emulsion polymerization to obtain an emulsion in which the average particle diameter of the primary particle of the polymer was 0.10 μm.

A non-crosslinked polymer powder (P-12) in which the average particle diameter of the secondary flocculate particle was 20 μm was obtained in the same manner as in the Production Example of the polymer powder (P-2) using the above-described emulsion obtained. The powder obtained (P-12) could be dissolved in methyl methacrylate completely, and the degree of swelling was equal to or more than 20-fold. The other physical properties are shown in Table 1.

(11) Production Example of polymer powder (P-13)

An emulsion in which the average particle diameter of the primary particle of a polymer was 0.18 μm was obtained in the same manner as in the Production Example of the polymer powder (P-6) except that the monomer to be added dropwise was a mixture consisting of 497.5 parts of methyl methacrylate, 2.5 parts of 1,3-butylene glycol dimethacrylate and 5 parts of sodium dialkylsulfosuccinate.

A crosslinked polymer powder (P-13) in which the average particle diameter of the secondary flocculate particle was 18 μm was obtained in the same manner as in the Production Example of the polymer powder (P-2) using the above-described emulsion obtained. The degree of swelling thereof was equal to or more than 20-fold. The other physical properties are shown in Table 1.

(12) Production Example of polymer powder (P-14)

An emulsion in which the average particle diameter of the primary particle of a polymer was 0.15 μm was obtained in the same manner as in the Production Examples of the polymer powders (P-1~P-3) except that the monomer to be added dropwise was a mixture consisting of 350 parts of methyl methacrylate, 150 parts of n-butyl acrylate and 5 parts of sodium dialkylsulfosuccinate.

A non-crosslinked polymer powder (P-14) in which the average particle diameter of the secondary flocculate particle was 30 μm was obtained in the same manner as in the Production Example of the polymer powder (P-2) (except that the inlet temperature/outlet temperature was 120° C./50° C.) using the above-described emulsion obtained. The powder obtained (P-14) had a degree of swelling of 1.2-fold. The other physical properties are shown in Table 1.

(13) Production Example of polymer powder (P-15)

Into a reaction apparatus equipped with a condensation tube, thermometer, stirrer and nitrogen introducing tube were dissolved 800 parts of distilled water and 1 part of polyvinyl alcohol (degree of saponification: 88%, degree of polymerization: 1000), then a monomer solution obtained by dissolving 400 parts of methyl methacrylate and 0.5 parts of azobisisobutyronitrile was introduced, and the resulted mixture was heated up to 80° C. with stirring at 400 rpm under nitrogen atmosphere over 1 hour and heated for 2 hours at the same temperature. Next, the mixture was heated up to 90° C. and heated for 2 hours at the same temperature, then it was further heated at 120° C. for completion of suspension polymerization to distill off the remaining monomers together with water to obtain a slurry. The resulted slurry was filtrated and washed, then dried by a hot-air drying machine at 50° C. to obtain a non-crosslinked polymer powder (P-15) having an average particle diameter of 88 μm. The powder obtained (P-15) had a degree of swelling of 1.2-fold. The other physical properties are shown in Table 1.

(14) Production Example of polymer powder (P-16)

A non-crosslinked polymer powder (P-16) having an average particle diameter of 350 μm was obtained in the same manner (except that the stirring speed was 300 rpm) as in the Production Example of the polymer powder (P-15). The powder obtained (P-16) had a degree of swelling of 1.2-fold. The other physical properties are shown in Table 1.

(15) Production Example of polymer powder (P-17)

A crosslinked polymer powder (P-17) was obtained having an average particle diameter of 30 μm in the same manner (except that the stirring speed was 500 rpm) as in the Production Example of the polymer powder (P-15) except that the monomer solution to be introduced was composed of 400 parts of methyl methacrylate, 2parts of neopentyl glycol dimethacrylate, 0.4 parts of n-dodecyl mercaptan and 1.2 parts of azobisisobutyronitrile. The powder obtained (P-17) had a degree of swelling of 5.6-fold. The other physical properties are shown in Table 1.

(16) Production Example of polymethyl methacrylate (B-1) in acrylic syrup

Into a reaction apparatus equipped with a condensation tube, thermometer, stirrer and nitrogen introducing tube were dissolved 800 parts of distilled water and 1 part of polyvinyl alcohol (degree of saponification:88%, degree of polymerization: 1000), then a monomer solution obtained by dissolving 400 parts of methyl methacrylate, 2 parts of n-dodecyl mercaptan and 2 parts of azobisisobutyronitrile was introduced, and the resulted mixture was heated up to 80° C. with stirring at 400 rpm under nitrogen atmosphere over 1 hour and heated for 2 hours at the same temperature. Next, the mixture was heated up to 90° C. and heated for 2 hours at the same temperature, then it was further heated at 120° C. for completion of suspension polymerization to distill off the remaining monomers together with water to obtain a slurry. The resulted slurry was filtrated and washed, then dried by a hot-air drying machine at 50° C. to obtain polymethyl methacrylate (B-1) having an average particle diameter of 93 μm. The polymethyl methacrylate obtained (B-1) had a weight-average molecular weight of 40000. The physical properties thereof are shown in Table 2.

(17) Production Example of acrylic copolymer (B-2) in acrylic syrup

An acrylic copolymer (B-2) was obtained in the same manner as in the Production Example (14) except that the monomer solution to be introduced was composed 376 parts of methyl methacrylate, 24 parts of methyl acrylate, 1.2 parts of n-dodecyl mercaptan and 2 parts of azobisisobutyronitrile. The polymer obtained (B-2) had an average particle diameter of 350 μm, and a weight-average molecular weight of 120000. The physical properties thereof are shown in Table 2.

(18) Production Example of acrylic copolymer (B-3) in acrylic syrup

An acrylic copolymer (B-3) was obtained in the same manner as in the Production Example (14) except that the monomer solution to be introduced was composed 368 parts of methyl methacrylate, 32 parts. of n-butyl acrylate, 1.6 parts of n-dodecyl mercaptan and 2 parts of azobisisobutyronitrile. The polymer obtained (B-3) had an average particle diameter of 350 μm, and a weight-average molecular weight of 70000. The physical properties thereof are shown in Table 2.

(19)Production Example of inorganic filler-containing resin particle (C)

To 100 parts of acrylic syrup composed of 69% of methyl methacrylate, 2% of ethylene glycol dimethacrylate and 29% of the polymethyl methacrylate (B-1) obtained in the Production Example (16) were added 2.0 parts of t-butyl peroxy benzoate (trade name: Perbutyl Z, manufactured by NOF Corp.) as a curing agent, 0.5 parts of zinc stearate as an internal releasing agent and 0.25 parts of a white inorganic pigment or black inorganic pigment, then added 200 parts of aluminium hydroxide (trade name: Higilite H-310, manufactured by Showa Denko K.K.) as an inorganic filler, and further added 30 parts of the polymer powder (P-2) obtained in the Production Example (1), and the mixture was kneaded for 10 minutes by a kneader to obtain an acrylic premix.

Then, this acrylic premix was filled in a mold for flat molding of 200 mm×200 mm, and was subjected to heat and pressure-curing for 10 minutes under conditions of a mold temperature of 130° C. and a pressure of 100 kg/cm$^2$ to obtain an acrylic artificial marble having a thickness of 10 mm. The resulted acrylic artificial marble was ground by a crusher to obtain a white or black inorganic filler-containing resin particle (C) having an average particle diameter of 350 μm. The powder characteristics this particle (C) are shown in Table 3.

TABLE 1

| polymer powder | composition of polymer powder | average particle diameter of primary particle ($\mu$m) | average particle diameter of secondary flocculated particle ($\mu$m) | bulk density (g/ml) | oil absorption (ml/100 g) | degree of swelling (-fold) | specific surface area (m$^2$/g) | weight-average molecular weight |
|---|---|---|---|---|---|---|---|---|
| P-1 | MMA = 100 | 0.08 | 8 | 0.25 | 120 | equal to or more than 20-fold | 55 | 600000 |
| P-2 | MMA = 100 | 0.08 | 30 | 0.40 | 100 | equal to or more than 20-fold | 51 | 600000 |
| P-3 | MMA = 100 | 0.08 | 100 | 0.60 | 80 | equal to or more than 20-fold | 42 | 600000 |
| P-4 | MMA = 100 | 0.11 | 50 | 0.50 | 90 | equal to or more than 20-fold | 49 | 900000 |
| P-5 | MMA/EA = 96/4 | 0.20 | 20 | 0.38 | 100 | equal to or more than 20-fold | 26 | 700000 |
| P-6 | MMA = 100 | 0.10 | 20 | 0.38 | 100 | equal to or more than 20-fold | 50 | 1400000 |
| P-7 | core phase: MMA/BDMA = 99.9/0.1 shell phase: MMA = 100 | 0.10 | 20 | 0.38 | 100 | equal to or more than 20-fold | 51 | shell phase: 1400000 |
| P-8 | MMA = 100 | 0.60 | 25 | 0.38 | 100 | equal to or more than 20-fold | 8.5 | 650000 |
| P-9 | MMA = 100 | 0.10 | 20 | 0.38 | 100 | equal to or more than 20-fold | 50 | 400000 |
| P-10 | MMA = 100 | 0.15 | 20 | 0.38 | 100 | equal to or more than 20-fold | 30 | 2500000 |
| P-11 | MMA = 100 | 0.18 | 20 | 0.38 | 100 | equal to or more than 20-fold | 24 | 3800000 |
| P-12 | MMA = 100 | 0.10 | 20 | 0.38 | 100 | equal to or more than 20-fold | 50 | 50000 |
| P-13 | MMA/BDMA = 99.5/0.5 | 0.18 | 18 | 0.38 | 95 | equal to or more than 20-fold | 24 | — |
| P-14 | MMA/nBA = 70/30 | 0.15 | 30 | 0.60 | 60 | 1.2 | 0.3 | 600000 |
| P-15 | MMA = 100 | 88 | — | 0.70 | 50 | 1.2 | 0.1 | 1200000 |
| P-16 | MMA = 100 | 350 | — | 0.73 | 50 | 1.2 | 0.07 | 1200000 |
| P-17 | MMA/NPGDMA = 99.5/0.5 | 30 | — | 0.57 | 50 | 5.6 | 0.2 | — |

MMA: methyl methacrylate
EA: ethyl acrylate
BDMA: 1,3-butylene glycol dimethacrylate
nBA: n-butyl acrylate
NPGDMA: neopentyl glycol dimethacrylate

TABLE 2

| polymer (b) | composition of polymer (b) | average particle diameter ($\mu$m) | bulk density (g/ml) | oil absorption (ml/100 g) | degree of swelling (-fold) | specific surface area (m$^2$/g) | weight-average molecular weight |
|---|---|---|---|---|---|---|---|
| B-1 | MMA = 100 | 93 | 0.70 | 45 | 1.2 | 0.07 | 40000 |
| B-2 | MMA/MA = 94/6 | 350 | 0.73 | 45 | 1.2 | 0.07 | 120000 |
| B-3 | MMA/nBA = 92/8 | 350 | 0.73 | 45 | 1.2 | 0.07 | 70000 |

MMA: methyl methacrylate
MA: methyl acrylate
nBA: n-butyl acrylate

TABLE 3

| inorganic filler-containing resin particle | average particle diameter ($\mu$m) | bulk density (g/ml) | oil absorption (ml/100g) | degree of swelling (-fold) | specific surface area (m$^2$/g) |
|---|---|---|---|---|---|
| C | 350 | 0.82 | 45 | 1.1 | 15 |

EXAMPLE 1

To 100 parts of acrylic syrup composed of 35% of methyl methacrylate, 30% of neopentyl glycol dimethacrylate and 35% of the polymethyl methacrylate (B-1) were added 1.5 parts of dicumyl peroxide (trade name: Percumyl D, manufactured by NOF Corp.) as a curing agent and 0.5 parts of zinc stearate as an internal releasing agent, then added 200 parts of aluminium hydroxide (trade name: HigiliteH-310, manufactured by Showa Denko K.K.) as an inorganic filler, and further added 25 parts of the polymer powder (P-1) obtained in the Production Example (1), and the mixture was kneaded for 10 minutes by a kneader to obtain an acrylic premix. The resulted premix had no stickiness and excellent handling property even immediately after kneading.

Then, this resulted acrylic premix was filled in a mold for flat molding of 200 mm×200 mm, and was subjected to heat and pressure-curing for 10 minutes under conditions of a mold temperature of 140° C. and a pressure of 100 kg/cm$^2$ to obtain an acrylic artificial marble having a thickness of 10 mm. The surface of the resulted acrylic artificial marble had extremely high gloss, specular condition having no defect and remarkably excellent surface smoothness, and the appearance thereof was remarkably excellent.

EXAMPLES 2 TO 10

Acrylic premixes were obtained in the same manner as in Example 1 except that the conditions were changed to conditions shown in Table 4. In the column of curing agent, "Perbutyl Z" means t-butyl peroxy benzoate (trade name: Perbutyl Z, manufactured by NOF Corp.), "Perhexa 3M" means 1,1-bis(t-butyl peroxy)3,3,5-trimethylcyclohexane (trade name: Perhexa 3M, manufactured by NOF Corp.), "AIBN" means azobisisobutyronitrile (trade name: V-60, manufactured by WAKO PURE CHEMICAL INDUSTRIES, LTD.) and "Perbutyl O" means t-butyl peroxy octate (trade name: Perbutyl O, manufactured by NOF Corp.). The premixes of Examples 2 to 8 had no stickiness and excellent handling property even immediately after kneading. Though the premixes of Examples 9 and 10 had no stickiness and excellent handling property when they were aged at room temperature after kneading, a long time not shorter than 16 hours was necessary for the aging.

Then, acrylic artificial marbles each having a thickness of 10 mm were obtained in the same manner (each mold pressure in Examples 6 to 10 was 50 kg/cm$^2$) as in Example 1 except that these acrylic premixes, obtained were used and the conditions were changed to conditions shown in Table 4. As is known from the results shown in Table 4, each appearance of the resulted artificial marbles was extremely excellent.

COMPARATIVE EXAMPLES 1 TO 5

Acrylic premixes were obtained in the same manner as in Example 6 except that the polymer powders (P-13), (P-14), (P-15) and (P-16) and the inorganic filler-containing resin particle (C) were used instead of the polymer powder (P-6) as shown in Table 4. The acrylic premixes of Comparative Examples 1 to 3 were aged at room temperature for thickening. A time not shorter than 16 hours was necessary for this thickening. The resulted premixes had stickiness and poor handling property. The acrylic premixes of Comparative Examples 4 and 5 had stickiness and poor handling property even 20 hours after kneading.

Then, acrylic artificial marbles each having a thickness of 10 mm were obtained in the same manner as in Example 6 using these acrylic premixes obtained. As is known from the results shown in Table 4, the surface of each acrylic artificial marble obtained had high gloss, however, it had pin-holes and the surface smoothness thereof was low, and the appearance was poor.

EXAMPLE 11

To 100 parts of-acrylic syrup composed of 48% of methyl methacrylate, 27% of neopentyl glycol dimethacrylate and 25% of the polymethyl methacrylate (B-1) were added 1.5 parts of t-butyl peroxy benzoate as a curing agent and 0.5 parts of zinc stearate as an internal releasing agent, then added as inorganic fillers 150 parts of aluminium hydroxide and black and white inorganic filler-containing resin particles (C) in the total amount of 70 parts, and further added 30 parts of the polymer powder (P-2), and the mixture was kneaded for 10 minutes by a kneader to obtain an acrylic premix. The resulted acrylic premix had no stickiness and excellent handling property even immediately after kneading.

Then, this resulted acrylic premix was filled in a mold for flat molding of 200 mm×200 mm, and was subjected to heat and pressure-curing for 10 minutes under conditions of a mold temperature of 130° C. and a pressure of 100 kg/cm$^2$ to obtain a granite-like acrylic artificial marble having a thickness of 10 mm. The surface of the resulted granite-like artificial marble manifested specular condition having no defect at all, had extremely high gloss and remarkably clear grain pattern, and there was no unevenness in the grain pattern at all. Therefore, it was a grain-like artificial marble having extremely excellent design and good appearance.

EXAMPLES 12 TO 18

Acrylic premixes were obtained in the same manner as in Example 11 except that the conditions were changed to conditions shown in Table 5. The premixes obtained had no stickiness and excellent handling property even immediately after kneading.

Then, granite-like acrylic artificial marbles each having a thickness of 10 mm were obtained in the same manner as in Example 11 except that these acrylic premixes obtained were used and the conditions were changed to conditions shown in Table 5. As is known from the results shown in Table 5, each appearance of the surface of the resulted granite-like artificial marbles was extremely excellent.

COMPARATIVE EXAMPLES 6 AND 7

Acrylic premixes were obtained in the same manner as in Example 13 except that the polymer powders (P-13) and (P-15) were used instead of the polymer powder (P-2) as shown in Table 5. These acrylic premixes were aged at room temperature for thickening. A time not shorter than 16 hours was necessary for this thickening. The resulted premixes had stickiness and poor handling property.

Then, granite-like acrylic artificial marbles each having a thickness of 10 mm were obtained in the same manner as in Example 13 using these acrylic premixes obtained. Each surface of the artificial marbles obtained had high gloss, however, it had relatively indefinite grain pattern, and there was unevenness in the grain pattern, therefore, the surface was poor in design.

COMPARATIVE EXAMPLES 8

An acrylic premix was obtained in the same manner as in Example 11 except that the conditions were changed to conditions shown in Table 5. This acrylic premix obtained had stickiness and poor handling property even 20 hours after kneading.

Then, a granite-like acrylic artificial marble having a thickness of 10 mm was obtained in the same manner as in Example 11 using this acrylic premix obtained. The surface of the artificial marble obtained had low gloss and indefinite grain pattern, and there was remarkable unevenness in the grain pattern, therefore, the surface was extremely poor in design.

EXAMPLE 19

Acrylic syrup (100 parts) composed of 48% of methyl methacrylate, 25% of neopentyl glycol dimethacrylate, 2% of ethylene glycol dimethacrylate and 25% of the polymethyl methacrylate (B-1) was introduced into a vessel made of SUS, to this were added 3 parts of t-butyl peroxy benzoate as a curing agent and 0.5 parts of zinc stearate as an internal releasing agent, then they were mixed by agitating blades driven by an air motor. The resulting mixture was continuously transported at a speed of 103.5 g/minute by a gear pump manufactured by Kawasaki Heavy Industries, Ltd. to a hopper appended to a kneading extruder (KRC kneader manufactured by Kurimoto, Ltd., screw diameter is 50 mm, L/D is 13.7).

On the other hand, aluminium hydroxide as an inorganic filler was introduced into a vessel made of SUS appended to a screw feeder 1 manufactured by Kuma Engineering K.K. and then was introduced continuously into a hopper appended to a kneading extruder at a speed of 220 g/minute.

Further, the polymer powder (P-2) was introduced into a vessel made of SUS appended to a screw feeder 2 manufactured by KUMA ENGINEERING CO., LTD. and then was introduced continuously into a hopper appended to an extruder at a speed of 25 g/minute.

Following the above-described manners, the acrylic syrup, polymer powder and inorganic filler were quantitatively introduced continuously, kneaded and thickened simultaneously in the kneading extruder to be extruded for giving continuously an acrylic premix in the form of a rope from the leading end port of the kneading extruder. The residence time of the materials in the kneading extruder was about 4 minutes. The resulted acrylic premix required no aging and was a dough-like material having excellent handling property without stickiness even immediately after discharged from the leading end port of the extruder.

Then, this resulted acrylic premix was filled in a mold for flat molding of 200 mm×200 mm, and was subjected to heat and pressure-curing for 10 minutes under conditions of a mold temperature of 130° C. and a pressure of 100 kg/cm$^2$ to obtain an acrylic artificial marble having a thickness of 10 mm. The surface of the resulted artificial marble had extremely high gloss, manifested specular condition having no defect at all, and had extremely high surface smoothness, therefore, the appearance thereof was remarkably excellent.

EXAMPLE 20

An acrylic premix formed in the form of a sheet was obtained by continuously introducing the materials into the kneading extruder in the same manner as in Example 19 except that a die was fitted to the leading end of e kneading extruder. The resulted acrylic premix formed material required no aging, and was a dough-like material having excellent handling property without stickiness even directly after discharged from the die.

Then, an acrylic artificial marble having a thickness of 10 mm was obtained in the same manner as in Example 19 using this acrylic premix formed in the form of a sheet. The surface of the resulted artificial marble had extremely high gloss, manifested specular condition having no defect at all, and had extremely high surface smoothness, therefore, the appearance thereof was remarkably excellent.

EXAMPLES 21 TO 25

Acrylic premixes formed in the form of a sheet were obtained in the same manner as in Example 20 except that the polymer powders (P-4), (P-7), (P-8), (P-9) and (P-10) were used instead of the polymer powder (P-2) as shown in Table 6. The resulted acrylic premix formed materials required no aging, and were dough-like materials having excellent handling property without stickiness even directly after discharged from the die.

Then, acrylic artificial marbles each having a thickness of 10 mm were obtained in the same manner as in Example 19 using these acrylic premixes formed in the form of a sheet. Each surface of the resulted artificial marbles had extremely high gloss, manifested specular condition having no defect at all, and had extremely high surface smoothness, therefore, the appearance thereof was remarkably excellent.

COMPARATIVE EXAMPLES 9 TO 11

Acrylic premixes were extruded in the same manner as in Example 20 except that the polymer powders (P-13), (P-16) and (P-17) were used instead of the polymer powder (P-2). The resulted acrylic premixes had not been sufficiently thickened, could not remain in the form of a sheet, and had extremely poor handling property with heavy stickiness.

Then, acrylic artificial marbles each having a thickness of 10 mm were obtained in the same manner as in Example 19 using these acrylic premixes. Each surface of the resulted artificial marbles had such defect as coagulation of the inorganic fillers due to uneven kneading, and poor surface smoothness, therefore, the appearance thereof was extremely poor.

EXAMPLE 26

Acrylic syrup (100 parts) composed of 48% of methyl methacrylate, 15% of neopentyl glycol dimethacrylate, 2% of ethylene glycol dimethacrylate and 35% of the polymethyl methacrylate (B-1) was introduced into a vessel made of SUS, to this were added 3 parts of t-butyl peroxy benzoate as a curing agent and 0.5 parts of zinc stearate as an internal releasing agent, then they were mixed by agitating blades driven by an air motor. The resulting mixture was continuously transported at a speed of 103.5 g/minute by a gear pump manufactured by Kawasaki Heavy Industries, Ltd. to a hopper appended to a kneading extruder (KRC kneader manufactured by Kurimoto, Ltd., screw diameter is 50 mm, LID is 13.7).

On the other hand, aluminium hydroxide as an inorganic filler was introduced into a vessel made of SUS appended to a screw feeder 1 manufactured by Kuma Engineering K.K. and then was introduced continuously into a hopper appended to a kneading extruder at a speed of 170 g/minute.

Also, black and white inorganic filler-containing resin particles (C) were introduced into a vessel made of SUS appended to a screw feeder 2 manufactured by Kuma Engineering K.K. and then was introduced continuously into a hopper appended to a kneading extruder at a speed of 70 g/minute.

Further, the polymer powder (P-2) was introduced into a vessel made of SUS appended to a screw feeder 3 manufactured by Kuma Engineering K.K. and then was introduced continuously into a hopper appended to an extruder at a speed of 25 g/minute.

Following the above-described manners, the acrylic syrup, polymer powder, inorganic filler and inorganic filler-containing resin particles were quantitatively introduced continuously, kneaded and thickened simultaneously in the kneading extruder to be extruded for giving continuously an acrylic premix in the form of a rope from the leading end port of the kneading extruder. The residence time of the materials in the kneading extruder was about 4 minutes. The resulted grain-like acrylic premix required no aging and was a dough-like material having excellent handling property without stickiness even immediately after discharged from the leading end port of the extruder.

Then, this resulted grain-like acrylic premix was filled in a mold for flat molding of 200 mm×200 mm, and was subjected to heat and pressure-curing for 10 minutes under conditions of a mold temperature of 130° C. and a pressure of 100 kg/cm$^2$ to obtain a granite-like acrylic artificial marble having a thickness of 10 mm. The surface of the resulted granite-like artificial marble manifested specular condition having no defect at all, had extremely high gloss and remarkably clear grain pattern, and there was no unevenness in the grain pattern at all. Therefore, it was a grain-like artificial marble having extremely excellent design and good appearance.

EXAMPLE 27

A grain-like acrylic premix formed in the form of a sheet was obtained by continuously introducing the materials into the kneading extruder in the same manner as in Example 26 except that a die was fitted to the leading end of the kneading extruder. The resulted grain-like acrylic premix formed material required no aging, and was a dough-like material having excellent handling property without stickiness even directly after discharged from the die.

Then, a granite-like acrylic artificial marble having a thickness of 10 mm was obtained in the same manner as in Example 26 using this acrylic premix formed in the form of a sheet. The surface of the resulted granite-like artificial marble manifested specular condition having no defect at all, had extremely high gloss and remarkably clear grain pattern, and there was no unevenness in the grain pattern at all. Therefore, it was a granite-like artificial marble having extremely excellent design and good appearance.

EXAMPLES 28 AND 29

Grain-like acrylic premixes formed in the form of a sheet were obtained in the same manner as in Example 27 except that the polymer powders (P-9) and (P-10) were used instead of the polymer powder (P-2) as shown in Table 7. The resulted grain-like acrylic premix formed materials required no aging, and were dough-like materials having excellent handling property without stickiness even directly after discharged from the die.

Then, granite-like acrylic artificial marbles each having a thickness of 10 mm were obtained in the same manner as in Example 26 using these acrylic premixes formed in the form of a sheet. Each surface of the resulted granite-like artificial marbles manifested specular condition having no defect at all, had extremely high gloss and remarkably clear grain pattern, and there was no unevenness in the grain pattern at all. Therefore, it was a granite-like artificial marble having extremely excellent design and good appearance.

COMPARATIVE EXAMPLES 12

The acrylic syrup, inorganic filler and inorganic filler-containing resin particles were quantitatively introduced continuously without using a thickening agent (polymer powder) as shown in Table 7 to extrude a grain-like acrylic premix from the die. The residence time of the materials in the kneading extruder was about 4 minutes. The method for introduction of the materials was the same as that in Example 26 (except that the introduction speed from the screw feeder 1 was 200 g/minute and the introduction speed from the screw feeder 2 was 100 g/minute). The resulted grain-like acrylic premix had not been sufficiently thickened, could not remain in the form of a sheet, and had extremely poor handling property with heavy stickiness.

Then, a granite-like acrylic artificial marble having a thickness of 10 mm was obtained in the same manner as in Example 26 using this acrylic premix. The resulted molded article had low gloss and extremely indefinite grain pattern. There was remarkable unevenness in the grain pattern. Therefore, it was extremely poor in design.

TABLE 4

| | polymer powder | | syrup | | inorganic filler | initiator | |
|---|---|---|---|---|---|---|---|
| | No. | amount added (parts by weight) | composition (% by weight) | amount added (parts by weight) | amount added (parts by weight) | kind | amount added (parts by weight) |
| Example 1 | P-1 | 25 | MMA/NPGDMA/B-1 = 35/30/35 | 100 | 200 | Percumyl D | 1.5 |
| Example 2 | P-2 | 30 | MMA/NPGDMA/B-1 = 48/27/25 | 100 | 150 | Perbutyl Z | 1.5 |
| Example 3 | P-3 | 40 | MA/BDMA/B-2 = 65/15/20 | 100 | 190 | Perhexa 3M | 1.5 |
| Example 4 | P-4 | 25 | MMA/EDMA/B-3 = 65/3/32 | 100 | 210 | AIBN | 1.3 |
| Example 5 | P-5 | 20 | MMA/TMPTMA/B-1 = 58/7/35 | 100 | 250 | AIBN | 1.3 |
| Example 6 | P-6 | 20 | MMA/TMPTMA/B-1 = 58/7/35 | 100 | 250 | Perbutyl O | 1.3 |
| Example 7 | P-7 | 20 | MMA/TMPTMA/B-1 = 58/7/35 | 100 | 250 | Perbutyl O | 1.3 |
| Example 8 | P-8 | 20 | MMA/TMPTMA/B-1 = 58/7/35 | 100 | 250 | Perbutyl O | 1.3 |
| Example 9 | P-11 | 25 | MMA/NPGDMA/B-1 = 40/25/35 | 100 | 170 | Perbutyl Z | 1.5 |
| Example 10 | P-12 | 25 | MMA/NPGDMA/B-1 = 40/25/35 | 100 | 170 | Perbutyl Z | 1.5 |
| Comparative Example 1 | P-13 | 20 | MMA/TMPTMA/B-1 = 58/7/35 | 100 | 250 | Perbutyl O | 1.3 |
| Comparative Example 2 | P-14 | 20 | MMA/TMPTMA/B-1 = 58/7/35 | 100 | 250 | Perbutyl O | 1.3 |
| Comparative Example 3 | P-15 | 20 | MMA/TMPTMA/B-1 = 58/7/35 | 100 | 250 | Perbutyl O | 1.3 |

TABLE 4-continued

| | | | | | | | |
|---|---|---|---|---|---|---|---|
| Comparative Example 4 | p-16 | 20 | MMA/TMPTMA/B-1 = 58/7/35 | 100 | 250 | Perbutyl O | 1.3 |
| Comparative Example 5 | C | 20 | MMA/TMPTMA/B-1 = 58/7/35 | 100 | 250 | Perbutyl O | 1.3 |

| | internal releasing agent | | thickening property of BMC | molding temperature (° C.) | appearance of molded article | |
|---|---|---|---|---|---|---|
| | kind | amount added (parts by weight) | | | gloss | surface smoothness |
| Example 1 | zinc stearate | 0.5 | ⊚ | 140 | ⊚ | ⊚ |
| Example 2 | zinc stearate | 0.5 | ⊚ | 130 | ⊚ | ⊚ |
| Example 3 | zinc stearate | 0.5 | ⊚ | 120 | ○ | ○ |
| Example 4 | zinc stearate | 1.0 | ⊚ | 110 | ○ | ⊚ |
| Example 5 | zinc stearate | 1.0 | ⊚ | 100 | ○ | ⊚ |
| Example 6 | zinc stearate | 1.0 | ⊚ | 95 | ○ | ⊚ |
| Example 7 | zinc stearate | 1.0 | ⊚ | 95 | ○ | ⊚ |
| Example 8 | zinc stearate | 1.0 | ⊚ | 95 | ○ | ⊚ |
| Example 9 | zinc stearate | 0.5 | ○ | 130 | ⊚ | ⊚ |
| Example 10 | zinc stearate | 0.5 | ○ | 130 | ⊚ | ⊚ |
| Comparative Example 1 | zinc stearate | 1.0 | △ | 95 | ○ | △ |
| Comparative Example 2 | zinc stearate | 1.0 | △ | 95 | ○ | △ |
| Comparative Example 3 | zinc stearate | 1.0 | △ | 95 | ○ | × |
| Comparative Example 4 | zinc stearate | 1.0 | × | 95 | ○ | × |
| Comparative Example 5 | zinc stearate | 1.0 | × | 95 | ○ | × |

MMA: methyl methacrylate
NPGDMA: neopentyl glycol dimethacrylate
BDMA: 1,3-butylene glycol dimethacrylate
TMPTMA: trimethylolpropane trimethacrylate
EDMA: ethylene glycol dimethacrylate
AIBN: azobisisobutyronitrile

TABLE 5

| | BMC composition (parts by weight) | | | | | | | | appearance of molded article | | |
|---|---|---|---|---|---|---|---|---|---|---|---|
| | syrup composition (% by weight) | syrup | inorganic filler | thickening agent | inorganic filler-containing resin particle | initiator | internal releasing agent | thickening property | molding temperature (° C.) | gloss | clearness of grain pattern | unevenness in grain pattern |
| Example 11 | MMA/NPGDMA/ B-1 = 48/27/25 | 100 | 150 | P-2 30 | 70 | Perbutyl Z 1.5 | zinc stearate 0.5 | ⊚ | 130 | ⊚ | ⊚ | ⊚ |
| Example 12 | MMA/NPGDMA/ EDMA/B-1 = 48/14/13/25 | 100 | 150 | P-2 30 | 70 | Perbutyl Z 1.5 | zinc stearate 0.5 | ⊚ | 130 | ⊚ | ⊚ | ⊚ |
| Example 13 | MMA/EDMA/ B-1 = 48/27/25 | 100 | 150 | P-2 30 | 70 | Perbutyl Z 1.5 | zinc stearate 0.5 | ⊚ | 130 | ○ | ⊚ | ⊚ |
| Example 14 | MMA/NPGDMA/ B-1 = 48/27/25 | 100 | 150 | P-2 30 | 70 | Perbutyl Z 1.5 | zinc stearate 0.5 | ⊚ | 130 | ○+ | ⊚ | ⊚ |
| Example 15 | MMA/NPGDMA/ B-1 = 48/27/25 | 100 | 150 | P-2 30 | 70 | Perbutyl Z 1.5 | zinc stearate 0.5 | ⊚ | 130 | ○ | ⊚ | ⊚ |

TABLE 5-continued

| | BMC composition (parts by weight) | | | | | | | | appearance of molded article | | |
|---|---|---|---|---|---|---|---|---|---|---|---|
| | syrup composition (% by weight) | syrup | inorganic filler | thickening agent | inorganic filler-containing resin particle | initiator | internal releasing agent | thickening property | molding temperature (° C.) | gloss | clearness of grain pattern | unevenness in grain pattern |
| Example 16 | MMA/NPGDMA/EDMA/B-1 = 48/15/2/35 | 100 | 170 | P-2 25 | 70 | Perhexa 3M 2.5 | zinc stearate 0.5 | ⊙ | 130 | ⊙ | ⊙ | ⊙ |
| Example 17 | MMA/NPGDMA/B-1 = 48/27/25 | 100 | 150 | P-9 30 | 70 | Perbutyl Z 1.5 | zinc stearate 0.5 | ⊙ | 130 | ⊙ | ⊙ | ○ |
| Example 18 | MMA/NPGDMA/B-1 = 48/27/25 | 100 | 150 | P-10 30 | 70 | Perbutyl Z 1.5 | zinc stearate 0.5 | ⊙ | 130 | ⊙ | ⊙ | ○ |
| Comparative Example 6 | MMA/EDMA/B-1 = 48/27/25 | 100 | 150 | P-13 30 | 70 | Perbutyl Z 1.5 | zinc stearate 0.5 | Δ | 130 | ○ | Δ | Δ |
| Comparative Example 7 | MMA/EDMA/B-1 = 48/27/25 | 100 | 150 | P-15 30 | 70 | Perbutyl Z 1.5 | zinc stearate 0.5 | Δ | 130 | ○ | Δ | Δ |
| Comparative Example 8 | MMA/EDMA/B-1 = 48/27/25 | 100 | 200 | — 0 | 100 | Perbutyl Z 1.5 | zinc stearate 0.5 | x | 130 | Δ | x | x |

MMA: methyl methacrylate
NPGDMA: neopentyl glycol dimethacrylate
EDMA: ethylene glycol dimethacrylate

TABLE 6

| | polymer powder | | syrup | | inorganic filler | initiator | |
|---|---|---|---|---|---|---|---|
| | No. | amount added (parts by weight) | composition (% by weight) | amount added (parts by weight) | amount added (parts by weight) | kind | amount added (parts by weight) |
| Example 19 | P-2 | 25 | MMA/NPGDMA/EDMA/B-1 = 48/25/2/25 | 100 | 220 | Perbutyl Z | 3.0 |
| Example 20 | P-2 | 25 | MMA/NPGDMA/EDMA/B-1 = 48/25/2/25 | 100 | 220 | Perbutyl Z | 3.0 |
| Example 21 | P-4 | 25 | MMA/NPGDMA/EDMA/B-1 = 48/25/2/25 | 100 | 220 | Perbutyl Z | 3.0 |
| Example 22 | P-7 | 25 | MMA/NPGDMA/EDMA/B-1 = 48/25/2/25 | 100 | 220 | Perbutyl Z | 3.0 |
| Example 23 | P-8 | 25 | MMA/NPGDMA/EDMA/B-1 = 48/25/2/25 | 100 | 220 | Perbutyl Z | 3.0 |
| Example 24 | P-9 | 25 | MMA/NPGDMA/EDMA/B-1 = 48/25/2/25 | 100 | 220 | Perbutyl Z | 3.0 |
| Example 25 | P-10 | 25 | MMA/NPGDMA/EDMA/B-1 = 48/25/2/25 | 100 | 220 | Perbutyl Z | 3.0 |
| Comparative Example 9 | P-13 | 25 | MMA/NPGDMA/EDMA/B-1 = 48/25/2/25 | 100 | 220 | Perbutyl Z | 3.0 |
| Comparative Example 10 | P-16 | 25 | MMA/NPGDMA/EDMA/B-1 = 48/25/2/25 | 100 | 220 | Perbutyl Z | 3.0 |
| Comparative Example 11 | P-17 | 25 | MMA/NPGDMA/EDMA/B-1 = 48/25/2/25 | 100 | 220 | Perbutyl Z | 3.0 |

| | internal releasing agent | | molding temperature (° C.) | continuous productivity of premix | shape stability of premix | appearance of molded article | |
|---|---|---|---|---|---|---|---|
| | kind | amount added (parts by weight) | | | | gloss | surface smoothness |
| Example 19 | zinc stearate | 0.5 | 130 | ⊙ | ⊙ | ⊙ | ⊙ |
| Example 20 | zinc stearate | 0.5 | 130 | ⊙ | ⊙ | ⊙ | ⊙ |
| Example 21 | zinc stearate | 0.5 | 130 | ⊙ | ⊙ | ⊙ | ⊙ |
| Example 22 | zinc stearate | 0.5 | 130 | ⊙ | ⊙ | ⊙ | ⊙ |
| Example 23 | zinc stearate | 0.5 | 130 | ⊙ | ⊙ | ⊙ | ⊙ |
| Example 24 | zinc stearate | 0.5 | 130 | ⊙ | ⊙ | ⊙ | ⊙ |
| Example 25 | zinc stearate | 0.5 | 130 | ⊙ | ⊙ | ⊙ | ⊙ |

TABLE 6-continued

|  |  |  |  |  |  |  |  |
|---|---|---|---|---|---|---|---|
| Comparative Example 9 | zinc stearate | 0.5 | 130 | x | x | x | Δ |
| Comparative Example 10 | zinc stearate | 0.5 | 130 | x | x | x | x |
| Comparative Example 11 | zinc stearate | 0.5 | 130 | x | x | x | x |

MMA: methyl methacrylate
NPGDMA: neopentyl glycol dimethacrylate
EDMA: ethylene glycol dimethacrylate

TABLE 7

| | BMC composition (parts by weight) | | | | | | | | appearance of molded article | | | |
|---|---|---|---|---|---|---|---|---|---|---|---|---|
| | Syrup composition (% by weight) | syrup | inorganic filler | thickening agent | inorganic filler-containing resin particle | initiator | internal releasing agent | molding temperature (° C.) | continuous productivity of premix | shape stability of premix | gloss | clearness of grain pattern | unevenness in grain pattern |
| Example 26 | MMA/NPGDMA/ EDMA/B-1 = 48/15/2/35 | 100 | 170 | P-2 25 | 70 | Perbutyl Z 3.0 | zinc stearate 0.5 | 130 | ⊚ | ⊚ | ⊚ | ⊚ | ⊚ |
| Example 27 | MMA/NPGDMA/ EDMA/B-1 = 48/15/2/35 | 100 | 170 | P-2 25 | 70 | Perbutyl Z 3.0 | zinc stearate 0.5 | 130 | ⊚ | ⊚ | ⊚ | ⊚ | ⊚ |
| Example 28 | MMA/NPGDMA/ EDMA/B-1 = 48/15/2/35 | 100 | 170 | P-9 25 | 70 | Perbutyl Z 3.0 | zinc stearate 0.5 | 130 | ⊚ | ⊚ | ⊚ | ⊚ | ○ |
| Example 29 | MMA/NPGDMA/ EDMA/B-1 = 48/15/2/35 | 100 | 170 | P-10 25 | 70 | Perbutyl Z 3.0 | zinc stearate 0.5 | 130 | ⊚ | ⊚ | ⊚ | ⊚ | ○ |
| Comparative Example 12 | MMA/NPGDMA/ EDMA/B-1 = 48/15/2/35 | 100 | 200 | — 0 | 100 | Perbutyl Z 3.0 | zinc stearate 0.5 | 130 | X | X | X | X | X |

MMA: methyl methacrylate
NPGDMA: neopentyl glycol dimethacrylate
EDMA: ethylene glycol dimethacrylate Thickening property of premix
  ⊚: A mixture thickened immediately after kneading, and provided a premix having excellent handling property without stickiness.
  ○: A premix having excellent handling property without stickiness was obtained, however, a time not shorter than 16 hours was necessary for the thickening.
  Δ: A time not shorter than 16 hours was necessary for the thickening, and the resulted premix had poor handling property with stickiness.
  X: Stickiness remained even after 20 hours or more, and handling property was extremely poor.
Gloss of molded article
  ⊚: Gloss is extremely high.
  ○+: Gloss is rather high.
  ○: Gloss is high.
  Δ: There is a gloss.
  X: Gloss is low.
Surface smoothness of molded article
  ⊚: There is no pinhole at all, and surface smoothness is extremely high.
  ○: There is no pin hole, and surface smoothness is high.
  Δ: There are pin holes, and surface smoothness is low.
  X: There are a lot of pin holes, and surface smoothness is extremely low.

Clearness of grain pattern of molded article
  ⊚: Grain pattern is extremely clear, and extremely excellent in design.
  ○: Grain pattern is clear, and excellent in design.
  Δ: Grain pattern is somewhat indefinite, and poor in design.
  X: Grain pattern is indefinite, and extremely poor in design.
Unevenness of grain pattern of molded article
  ⊚: There is no unevenness in grain pattern at all, and design is extremely excellent.
  ○: There is no unevenness in grain pattern, and design is excellent.
  Δ: There is unevenness ingrain pattern, and design is poor.
  X: There is heavy unevenness in grain pattern, and design is extremely poor.
Continuous productivity of premix
  ⊚: A mixture thickened immediately in kneading in an extruder and an acrylic premix having excellent handling property without stickiness was continuously obtained from the leading end of the extruder.
  X: A mixture did not thickened in kneading in an extruder and the acrylic premix extruded from the leading end of the extruder had extremely poor handling property with stickiness.

Shape stability of premix formed article

⊚: When a mixture was extruded through a die having a given form, a premix formed article having the given cross sectional form was obtained.

X: Though a mixture was extruded through a die having a given form, the acrylic premix extruded did not keep the given form.

As is apparent also from the above-described examples, an acrylic resin composition excellent in thickening property can be obtained by using as a thickening agent a specific polymer powder. Further, a premix suitable for high temperature molding and excellent in molding processability can be obtained by using this acrylic resin composition. Moreover, an acrylic artificial marble produced using this premix has excellent appearance and is very advantageous for industrial use.

What is claimed is:

1. An acrylic resin composition comprising a non-crosslinked polymer powder having a bulk density within the range from 0.1 to 0.7 g/ml, an oil absorption based on linseed oil within the range from 60 to 200 ml/100 g and a degree of swelling by methyl methacrylate of 16-fold or more, and acrylic syrup consisting essentially of methyl methacrylate or a (meth)acrylic monomer mixture (a) and poly(methyl methacrylate) or an acrylic copolymer (b); wherein said polymer powder is formed from monomers selected from the group consisting of a (meth)acrylate having an alkyl group with 1 to 20 carbon atoms, a cyclohexyl (meth)acrylate, a glycidyl (meth)acrylate, a hydroxyalkyl (meth)acrylate, (meth)acrylic acid, a metal salt of (meth)acrylic acid, fumaric acid, a fumarate, maleic acid, a maleate, an aromatic vinyl, vinyl acetate, (meth)acrylic amide, (meth)acrylonitrile, vinyl chloride, maleic anhydride and a mixture thereof.

2. The acrylic resin composition according to claim 1, wherein the weight-average molecular weight of the polymer powder is equal to or more than 100000.

3. The acrylic resin composition according to claim 1, wherein the specific surface area of the polymer powder is within the range from 1 to 100 m²/g.

4. The acrylic resin-composition according to claim 1, wherein the average particle size of the polymer powder is within the range from 1 to 250 μm.

5. The acrylic resin composition according to claim 1, wherein the polymer powder is a secondary flocculate obtained by flocculation between primary particles.

6. The acrylic resin composition according to claim 5, wherein the average particle diameter of the primary particle of the polymer powder is within the range from 0.03 to 1 μm.

7. The acrylic resin composition according to claim 1, wherein the polymer powder is constituted of an acrylic polymer.

8. The acrylic resin composition according to claim 1, wherein the polymer powder has a core/shell structure.

9. An acrylic premix comprising the acrylic resin composition of claim 1 and an inorganic filler.

10. The acrylic premix according to claim 9 further comprising an inorganic filler-containing resin particle.

11. The acrylic premix according to claim 9 comprising a polyfunctional (meth)acrylate monomer as a part of the monomer mixture (a) constituting the acrylic resin composition.

12. The acrylic premix according to claim 11 wherein the polyfunctional (meth)acrylate monomer is neopentyl glycol dimethacrylate.

13. The acrylic premix according to claim 9 further comprising zinc stearate.

14. A method for producing an acrylic artificial marble in which the acrylic premix of claim 9 is subjected to heat and pressure-curing.

15. An acrylic premix obtained by kneading uniformly the constituent components of the acrylic resin composition of claim 1 and an inorganic filler and simultaneously thickening and extruding the mixture to continuously form the mixture into a desired form.

16. The method for producing an acrylic artificial marble in which the acrylic premix of claim 15 is subjected to heat and pressure-curing.

17. A thickening agent consisting essentially of a non-crosslinked polymer powder having a bulk density within the range from 0.1 to 0.7 g/ml, an oil absorption based on linseed oil within the range from 60 to 200 ml/100 g and a degree of swelling by methyl methacrylate of 16-fold or more; wherein said polymer powder is formed from monomers selected from the group consisting of a (meth)acrylate having an alkyl group with 1 to 20 carbon atoms, a cyclohexyl (meth)acrylate, a glycidyl (meth)acrylate, a hydroxyalkyl (meth)acrylate, (meth)acrylic acid, a metal salt of (meth)acrylic acid, fumaric acid, a fumarate, maleic acid, a maleate, an aromatic vinyl, vinyl acetate, (meth)acrylic amide, (meth)acrylonitrile, vinyl chloride, maleic anhydride and a mixture thereof.

18. The thickening agent according to claim 17, wherein the weight-average molecular weight of the polymer powder is equal to or more than 100000.

19. The thickening agent according to claim 17, wherein the specific surface area of the polymer powder is within the range from 1 to 100 m²/g.

20. The thickening agent according to claim 17, wherein the average particle diameter of the polymer powder is within the range from 1 to 250 μm.

21. The thickening agent according to claim 17, wherein the polymer powder is a secondary flocculate obtained by flocculation between primary particles.

22. The thickening agent according to claim 21, wherein the average particle diameter of the primary particle of the polymer powder is within the range from 0.03 to 1 μm.

23. The thickening agent according to claim 17, wherein the polymer powder is constituted of an acrylic polymer.

* * * * *